US008545656B2

(12) United States Patent
Iwai et al.

(10) Patent No.: US 8,545,656 B2
(45) Date of Patent: Oct. 1, 2013

(54) METHOD OF MANUFACTURING RESIN PIPE

(75) Inventors: Yuka Iwai, Tokyo (JP); Yoji Arakawa, Tokyo (JP); Yasunori Sugihara, Tokyo (JP); Munehito Kawakami, Tokyo (JP); Hiroyuki Nakamura, Tokyo (JP)

(73) Assignees: Fuji Jukogyo Kabushiki Kaisha, Tokyo (JP); The Society of Japanese Aerospace Companies, Tokyo (JP)

( * ) Notice: Subject to any disclaimer, the term of this patent is extended or adjusted under 35 U.S.C. 154(b) by 480 days.

(21) Appl. No.: 12/412,988

(22) Filed: Mar. 27, 2009

(65) Prior Publication Data
US 2009/0260745 A1 Oct. 22, 2009

(30) Foreign Application Priority Data

Apr. 17, 2008 (JP) .................................. 2008-107549

(51) Int. Cl.
*B65H 81/00* (2006.01)

(52) U.S. Cl.
USPC ............................ 156/184; 156/195; 156/155

(58) Field of Classification Search
CPC .................................. B28B 7/30; B65H 81/00
USPC ................ 156/166, 184, 195, 173, 158, 155, 156/189, 84, 86; 425/403, 393; 249/177
See application file for complete search history.

(56) References Cited

U.S. PATENT DOCUMENTS

| 3,397,847 | A | * | 8/1968 | Thaden ...................... 242/437.1 |
| 3,425,982 | A | * | 2/1969 | Fink .............................. 524/413 |
| 4,785,852 | A | | 11/1988 | Okahashi et al. |
| 4,875,717 | A | | 10/1989 | Policelli |
| 5,350,139 | A | * | 9/1994 | Leyderman .................. 249/177 |
| 6,016,848 | A | * | 1/2000 | Egres, Jr. ..................... 138/137 |
| 6,063,277 | A | * | 5/2000 | Bennett et al. ........... 210/321.78 |
| 8,215,341 | B2 | | 7/2012 | Iwai et al. |
| 2002/0001689 | A1 | * | 1/2002 | Takeuchi et al. ........... 428/36.91 |
| 2004/0158275 | A1 | * | 8/2004 | Crank et al. .................. 606/200 |
| 2006/0054231 | A1 | | 3/2006 | Wolfram et al. |
| 2007/0051418 | A1 | | 3/2007 | Rowles et al. |
| 2009/0260703 | A1 | | 10/2009 | Iwai et al. |

FOREIGN PATENT DOCUMENTS

| JP | 09-277391 | | 10/1997 |
| JP | 10-305492 | A | 11/1998 |
| JP | 2001-270005 | | 10/2001 |

* cited by examiner

*Primary Examiner* — Katarzyna Wyrozebski Lee
*Assistant Examiner* — Vishal I Patel
(74) *Attorney, Agent, or Firm* — Smith, Gambrell and Russell, LLP

(57) ABSTRACT

Disclosed is a method for manufacturing a resin pipe, including: heating a sheet member after winding the sheet member around a bar desired multiple times and holding the sheet member, wherein the sheet member is melted and molded into a resin pipe by the heating, and the bar is removed from the resin pipe after the heating.

14 Claims, 4 Drawing Sheets

METHOD OF MANUFACTURING RESIN PIPE

BACKGROUND OF THE INVENTION

1. Field of the Invention

The present invention relates to a method of manufacturing a resin pipe.

2. Description of the Related Art

Currently, there has been a demand for the reduction of the weight of an aircraft and a spacecraft. Accordingly, a fiber reinforced resin composite material of which the strength is relatively high has begun to be used for various parts of an aircraft, such as wings and a fuselage.

A metal pipe, such as an aluminum pipe or a titanium pipe, has been generally used as a pipe, which is used for the aircraft and the spacecraft. However, there is a tendency to reduce the weight of the aircraft and the spacecraft by making the pipe with a fiber reinforced resin composite material.

Currently, as a pipe using a fiber reinforced resin composite material, a sewage pipe (of which the maximum internal pressure is 1.0 MPa or less), which uses the corrosion resistance of a fiber reinforced resin, or the like has been put into practical use in a general industrial field other than an aerospace field.

However, a lightweight property is required for the aircraft and the spacecraft, together with pressure resistance and air-tightness (gas barrier properties). With only a fiber reinforced resin composite material, it is difficult to secure airtightness and there is a concern that a medium flowing through the pipe leaks.

A method of manufacturing a fiber reinforced resin composite pipe has been disclosed in Japanese Patent Application Laid-Open (JP-A) Nos. 9-277391 and 2001-270005. JP-A No. 2001-270005 discloses that an inner face-protecting layer (7) made of only a resin is formed in the innermost layer of a fiber reinforced resin composite pipe.

However, there is lack of choices as a method of manufacturing a resin pipe that may be applied as an airtight layer of the fiber reinforced resin composite pipe.

Further, a specific technique is needed to form a bent portion at a resin pipe.

SUMMARY OF THE INVENTION

The present invention addresses the above-identified, and other problems associated with conventional methods and apparatuses, and provides a new method of manufacturing a resin pipe.

According to an aspect of the present invention, there is provided a method for manufacturing a resin pipe, including: heating a sheet member after winding the sheet member around a bar desired multiple times and holding the sheet member, wherein the sheet member is melted and molded into a resin pipe by the heating, and the bar is removed from the resin pipe after the heating.

Preferably, the bar is made of a water-soluble material withstanding the heating, and the bar is dissolved in water so as to be removed from the resin pipe after the heating.

Preferably, the heating is performed after the bar is made of a water-soluble material withstanding the heating so as to have a curved portion of which an axis is a curve and the sheet member is wound around the bar and held, and the bar is dissolved in water so as to be removed from the resin pipe after the heating.

Preferably, the heating is performed after the sheet member is formed in an elongate shape in a winding direction and is spirally wound around the curved portion and held.

Preferably, the sheet member is held while being wound around the bar, by welding a wind start end and a wind finish end of the sheet member that is spirally wound.

Preferably, the heating is performed, after the heat-resistant film is wound on an outer peripheral surface of the sheet member that is held while being wound around the bar.

Preferably, the winding of the sheet member around the bar desired multiple times and the holding of the sheet member are performed two or more times.

Preferably, the new heat-resistant film is wound on the outer peripheral surface of the sheet member for each heating, and the heating is performed two or more times.

Preferably, the heating is performed, after the heat-resistant film is spirally wound on the outer peripheral surface of the sheet member on the curved portion and held while being tensed in the winding direction.

Preferably, an outer pipe made of a fiber reinforced resin composite material is molded on an outer peripheral surface of the resin pipe.

Preferably, the fiber reinforced resin composite material is hardened while the fiber reinforced resin composite material is tightened up by a heat-shrinkable tape, and molded into an outer pipe, by performing heating while the heat-shrinkable tape is wounded on an outer peripheral surface of the fiber reinforced resin composite material that is formed on the outer peripheral surface of the resin pipe.

Preferably, when the heat-shrinkable tape is wound on the outer peripheral surface of the fiber reinforced resin composite material, the heat-shrinkable tape is spirally wound on the outer peripheral surface of the sheet member on the curved portion and held while being tensed in the winding direction.

According to an embodiment of the present invention, a sheet member is heated after a sheet member is wound around a bar desired multiple times and held. Accordingly, it may be possible to obtain an advantage of melting the sheet member and molding the sheet member into a resin pipe.

Further, according to the embodiment of the present invention, in a method of molding a resin pipe by winding a sheet member around a bar and heating the sheet member, it may be possible to obtain an advantage of molding a resin pipe, which has a curved portion, with small number of wrinkles.

DESCRIPTION OF THE PREFERRED EMBODIMENTS

An embodiment of the present invention will be described below with reference to accompanying drawings. The following description is related to an embodiment of the present invention, and does not limit the invention.

A method of manufacturing an L-shaped CFRP pipe, which includes mouthpieces at both ends thereof, will be described below. However, a resin pipe with a mouthpiece is related to another application of the present applicant, and is not a requisite of this invention.

(1) First, an L-shaped bar 30 including a curved portion 30*a* is formed as shown in FIG. 1. The L-shaped bar 30 is made of sodium chloride. The L-shaped bar 30 is produced by solidifying sodium chloride in a mold.

(2) Then, a sheet member 31 made of a liquid crystal polymer is wound around the curved portion 30*a* of the L-shaped bar 30. The sheet member 31 is formed in an elongate shape in a winding direction. Further, one end of the elongate sheet member 31 is fixed, and the other end thereof is spirally wound around the curved portion 30*a* while being tensed. Accordingly, wrinkles or looseness is not generated on the sheet member 31 as much as possible. For example, if a belt-shaped sheet member 31 cut to have a width of 5 (mm) is spirally wound around an L-shaped bar 30 having a diameter of 20 (mm) while being tensed, it may be possible to reduce wrinkles generated when the sheet member is wound.

Figure 1A:
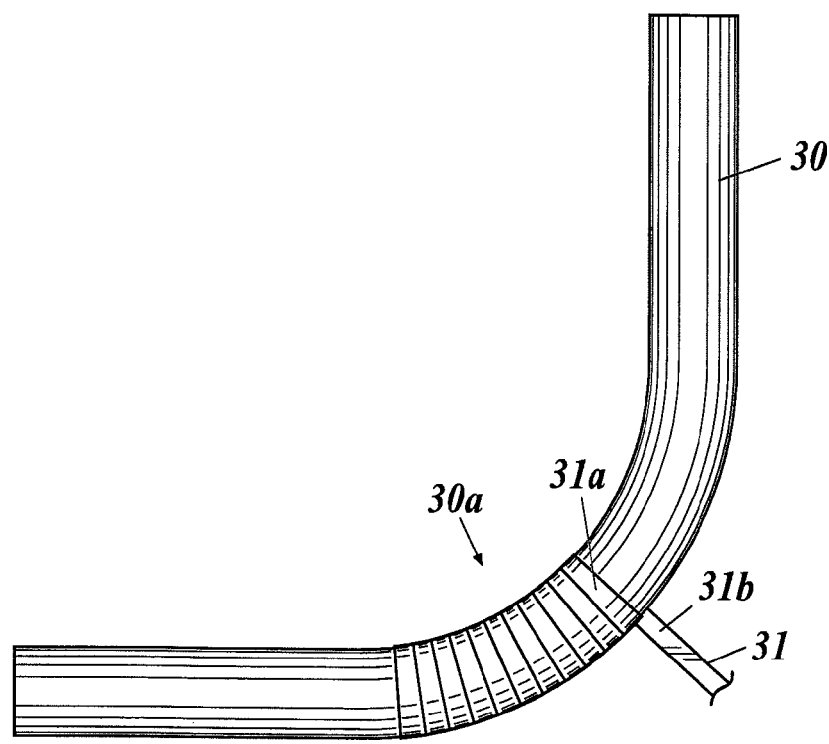
FIGS. 1A and 1B are views illustrating processes of a method of manufacturing a resin pipe according to an embodiment of the present invention.

When the sheet member 31 is spirally wound, adjacent round portions of the sheet member 31 are wound so as to overlap each other as shown in FIG. 1A like a portion 31*a* of the sheet member that corresponds to one turn and a portion 31*b* of the sheet member that corresponds to one turn and is adjacent to the portion.

Figure 1B:
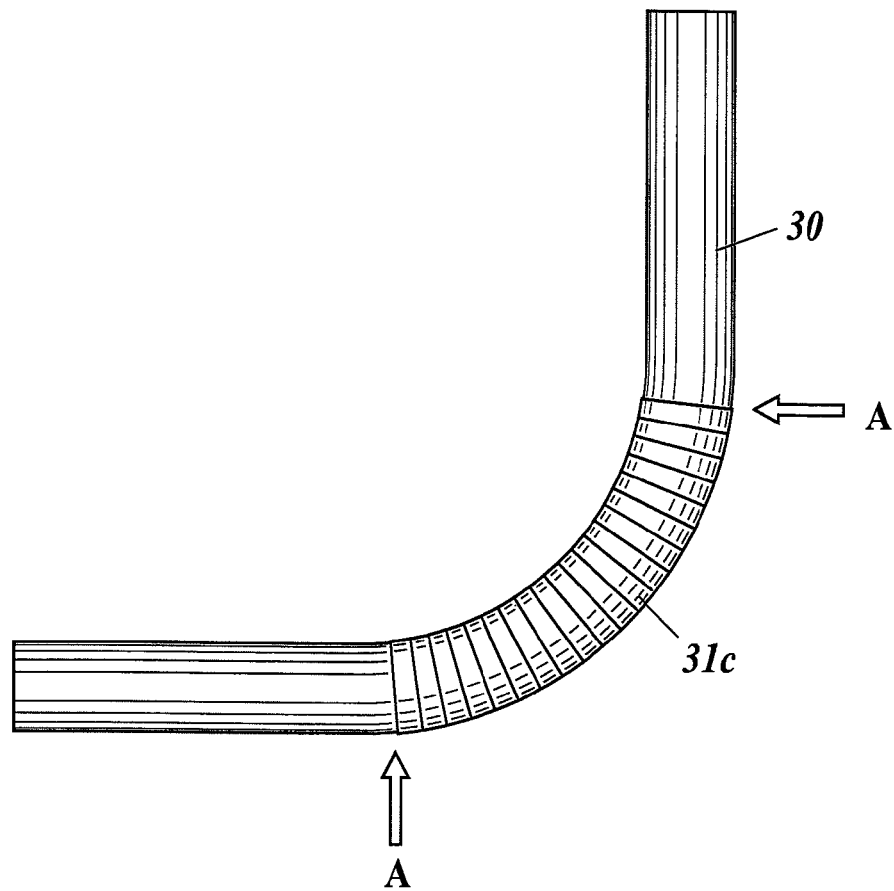

After the sheet member 31 is completely wound, a wind start end and a wind finish end of the sheet member 31 are welded by applying a hot gun as shown in FIG. 1B by arrow A, so that the sheet member 31 is held while being wound around the L-shaped bar 30. This portion is referred to as a curvedly wound sheet portion 31*c*. Even when the hot gun is applied, an extension portion of the sheet member 31 is tensed and a superfluous extension portion may be cut off after welding. In any case, it is preferable that the sheet member 31 be held on the L-shaped bar 30 while a tension is applied to the sheet member 31. The wind start end and the wind finish end may be welded to portions of the sheet member 31 that are positioned below themselves and overlap themselves. Each of the wind start end and the wind finish end is welded to a portion of the sheet member 31 that is positioned below itself and overlaps itself, while the portion of the sheet member is melted.

Meanwhile, if the total thickness of the laminated sheet member 31 is not enough or there is an empty space between adjacent portions of the sheet member 31, the sheet member 31 is further wound on the curvedly wound sheet portion 31*c* and held in the same manner as described above, which is repeated.

Figure 2:
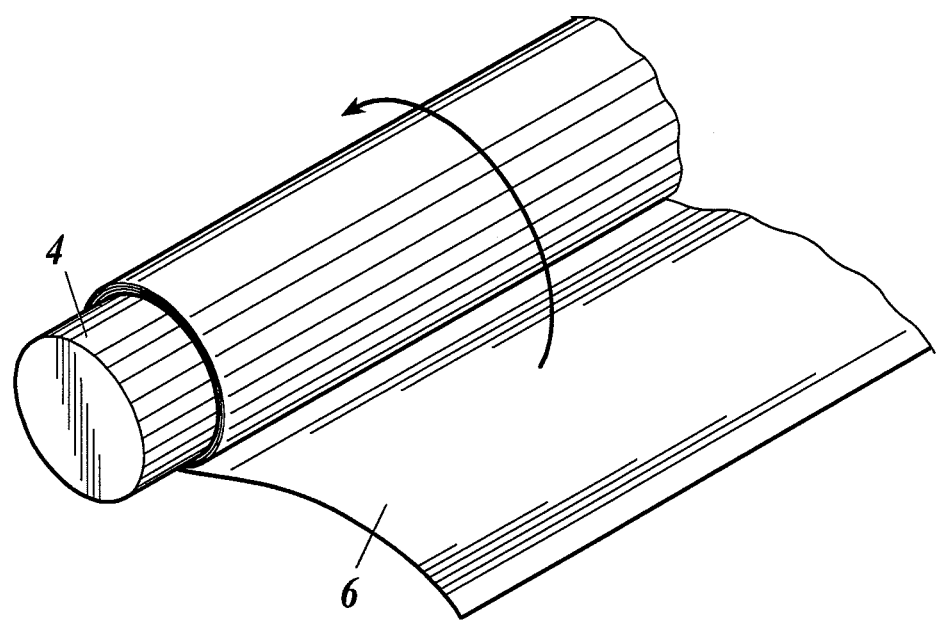
FIG. 2 is a view illustrating a process of the method according to the embodiment of the present invention.

Meanwhile, in order to form a linear resin pipe and a linear portion of a resin pipe, as shown in FIG. 2, a sheet member 6, which is cut to have a width corresponding to the length of the linear portion to be formed, is wound around a bar 4 desired multiple times and held on the bar 4.

Figure 3:
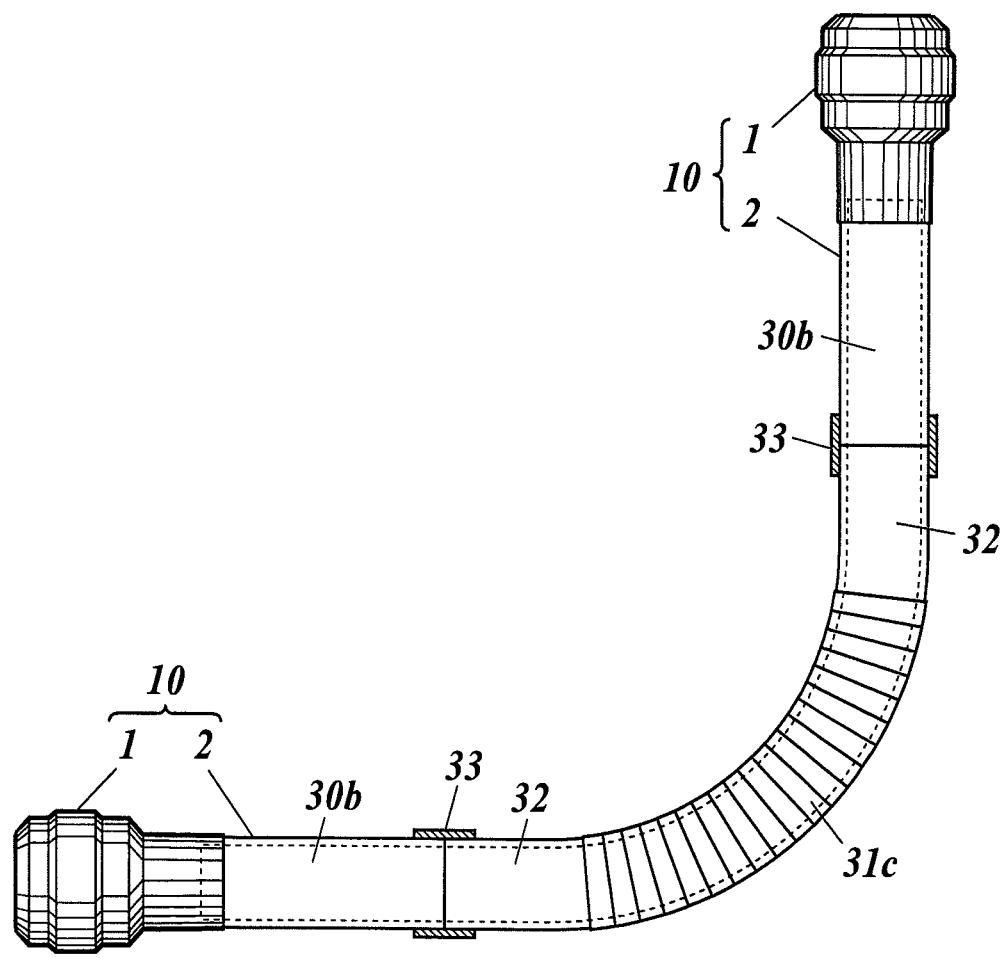
FIG. 3 is a view illustrating a process of the method according to the embodiment of the present invention.

Linearly wound sheet portions 32 are formed on linear portions, which are connected to the curved portion 30*a* of the L-shaped bar 30, as shown in FIG. 3 by the same method as described above.

(3) The sheet member 31, which is wound around the curved portion 30*a* of the L-shaped bar 30 and held in the process (2), may be molded once by an autoclave. Alternatively, the sheet member is not put in an autoclave in order to reduce cost, and the outer surface of the sheet member 31 wound around the L-shaped bar 30 is heated by a hot gun and is molded to some extent while the melting is visually checked.

(4) After that, as shown in FIG. 3, both linear ends of the L-shaped bar 30, which protrude from the linearly wound sheet portions 32, are inserted into resin pipes 10 and 10 with mouthpieces, respectively, so that the linearly wound sheet portions 32 are butted against resin pipes 2. The resin pipe 10 with a mouthpiece is formed by attaching a mouthpiece 1 to the outer periphery of an end of the resin pipe 2 that is made of a liquid crystal polymer. A sheet member 33 made of a liquid crystal polymer is wound around a connection portion between the linearly wound sheet portion 32 and the resin pipe 2.

(5) A heat-resistant film made of polyimide is wound on the outer peripheral surfaces of the curvedly wound sheet portion 31*c*, the linearly wound sheet portion 32, and the resin pipe 2, and is sufficiently tightened up. An elongate member such as the sheet member 31 may be used for the winding of the heat-resistant film around the curvedly wound sheet portion 31*c*, and is spirally wound on the outer peripheral surface of the curvedly wound sheet portion 31*c* while being tensed in the winding direction. If the heat-resistant film is applied, it may be possible to suppress the generation of wrinkles of the resin pipe after the molding. In particular, it may be possible to effectively suppress the generation of wrinkles on the curved portion of the resin pipe where wrinkles are apt to be generated.

(6) After a bar-shaped jig is further inserted into the end of the resin pipe 2 disposed in the mouthpiece 1, the assembly set in the process (5) is bagged, that is, these are put in a heat-resistant bag and the bag is made to be vacuum and is lashed down. A polyimide film is used as a material of the heat-resistant bag.

(7) The assembly set in the process (6) is heated and pressured by an autoclave, so that a heating process is performed. In this heating process, temperature rises up to the fusion temperature of a liquid crystal polymer, and the sheet members 31*c*, 32, and 33 and the resin pipes 2 are melted and molded into an integrated L-shaped resin pipe.

(8) Debugging is performed after the heating process (7).

(9) The heat-resistant film is removed. A new heat-resistant film is wound on the outer peripheral surface of the L-shaped resin pipe in the same manner as the process (5), and is bagged. Then, a heating process is performed again by an autoclave. That is, in this heating process, a liquid crystal polymer of the resin pipe is melted, and an L-shaped resin pipe is further molded. It may be possible to remove the wrinkles of the resin pipe, which is generated in the first heating process, by the second heating process. In particular, it may be possible to effectively remove the wrinkles on the curved portion of the resin pipe where wrinkles are apt to be generated.

(10) Debugging is performed after the heating process (9). As described above, the resin pipes 2 and 2, the linearly wound sheet portions 32 and 32, and the curvedly wound sheet portion 31*c* of FIG. 3 are molded into an integrated L-shaped resin pipe.

Figure 4:
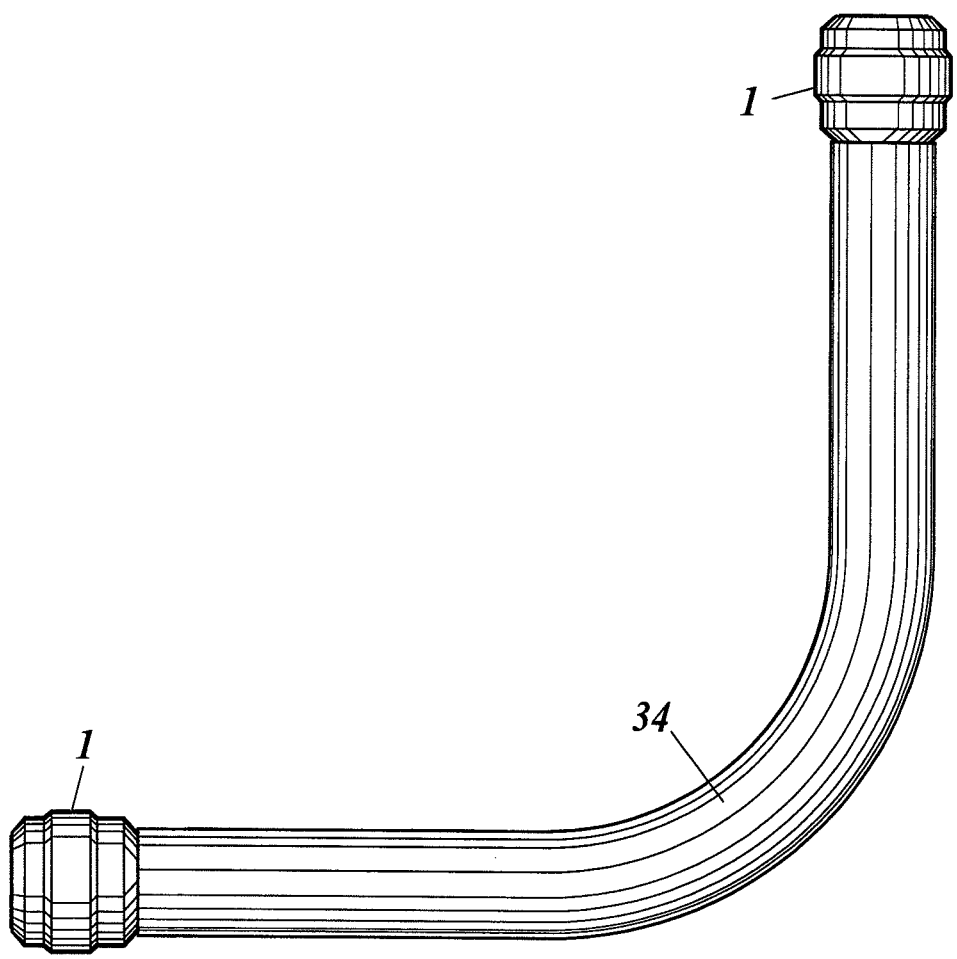
FIG. 4 is a view showing a product that is finished by the method according to the embodiment of the present invention.

(11) An adhesion pretreatment is performed on an outer peripheral surface of the end of the mouthpiece, an adhesive is applied to the outer peripheral surface of the end of the mouthpiece, and an unhardened carbon fiber reinforced resin composite material (CFRP) is laminated on the outer peripheral surface of the end of the mouthpiece and the outer peripheral surface of the L-shaped resin pipe connected to the outer peripheral surface of the end of the mouthpiece. A heat-shrinkable tape is wound on the outer peripheral surface of the CFRP, is further bagged, and is heated and pressurized by an autoclave so that the CFRP is hardened. When the heating is performed by an autoclave, the CFRP is tightened up by the heat-shrinkable tape and molded into an outer pipe 34 of the CFRP shown in FIG. 4. If being sufficiently pressurized by only the heat-shrinkable tape, the CFRP may be heated by an oven and hardened. An elongate member such as the sheet member 31 may be used for the winding of the heat-shrinkable tape around the curved portion, and the heat-shrinkable tape is spirally wound on the outer peripheral surface of the CFRP while being tensed in the winding direction. If the heat-shrinkable tape is applied, it may be possible to suppress the generation of wrinkles on a CFRP pipe. In particular, it may be possible to effectively suppress the generation of wrinkles on the curved portion of the CFRP pipe where wrinkles are apt to be generated.

(12) After the heating process (11), bagging is performed, a heat-shrinkable tape is removed, a jig inserted into the mouthpiece 1 is extracted, and the L-shaped bar 30 is dissolved in water and is removed from the L-shaped resin pipe. Accordingly, an L-shaped CFRP pipe, which includes the mouthpieces 1 and 1 shown in FIG. 4 at both ends thereof and L-shaped resin pipe therein, is completed.

The resin pipe provided in the CFRP pipe is made of a liquid crystal polymer that is a thermoplastic resin having high gas barrier properties, and the outer pipe is made of a CFRP that has high strength and high pressure resistance. Accordingly, since the CFRP pipe has a two-layer structure that includes an airtight layer made of a liquid crystal polymer and a pressure-resistant layer made of the CFRP, the CFRP pipe has high pressure resistance and high airtightness (gas barrier properties).

If a core jig is made of metal such as aluminum when a pipe of which an axis is curved as described above is produced, the core jig is not extracted. For this reason, it is not possible to produce a pipe. In addition, since a liquid crystal polymer (LCP) used as an airtight layer is melted at high temperature of about 300° C., it may not be possible to use an organic water-soluble jig. In this embodiment, after a pressure-resistant layer has been molded using a water-soluble jig made of salt, the curved portion has been molded by dissolving the jig in water. The jig made of salt has a melting point of about 800° C., and can withstand the temperature of about 300° C. As long as appropriate heat resistance and water solubility are obtained, any material may be used.

A sheet-shaped LCP does not have tackiness. It is difficult to bag the sheet-shaped LCP while the shape of the sheet-shaped LCP is maintained when the sheet-shaped LCP is hardened. For this reason, while being bound by a tape such as a polyimide tape, the LCP needs to be adapted to a mold. However, since the LCP is melted and molded at about 300° C., the polyimide tape can withstand the temperature of about 300° C. but it can be seen that the glue of the polyimide tape is melted and attached to the LCP. Further, in this embodiment, a method, which maintains the shape of the LCP by melting the LCP by a hot gun and adapting the LCP to a mold, has been employed as a method of maintaining the shape without using a polyimide tape.

As compared to the linear portion, wrinkles are apt to be generated on the curved portion when the sheet-shaped LCP is wound and molded. Since the wrinkles may become origins of fracture, the wrinkles need to be removed. Since the bagging necessarily causes wrinkles during the bagging, the wrinkles are transferred to the LCP. Further, since the LCP does not have tackiness, the LCP is difficult to be adapted to the jig. In this case, a polyimide film having a width of 10 mm is spirally wound around the bar having a diameter of 20 mm. Accordingly, the LCP comes in close contact with the L-shaped bar 30, so that it may be possible to suppress the generation of wrinkles.

In the embodiment, after the sheet-shaped LCP is wound, the temperature of the LCP rises up to the melting point of the LCP once by an autoclave and the LCP is molded. However, as for one molding, wrinkles are generated on the LCP after the molding. Since wrinkles make a bag used for bagging follow to the shape of a mold during the bagging, the wrinkles need to be formed and the melted LCP penetrates the wrinkles. The generation of the wrinkles is decreased by winding a polyimide film on the LCP. However, when the polyimide film is wound, wrinkles are also generated on the polyimide film. Accordingly, the wrinkles are transferred to the LCP, so that wrinkles may be generated. If the wrinkles are left, the wrinkles may become origins of fracture. Therefore, the wrinkles need to be removed. However, in general, it is difficult to remove wrinkles generated when a polyimide film is wound or bagging is performed. Further, if portions corresponding to the wrinkles are removed by a file after the molding, a hole may be formed at the LCP layer securing airtightness. In this embodiment, a method of performing heating and molding two times by an autoclave has been employed in order to simply remove the wrinkles. If this method is used, it may be possible to suppress the generation of wrinkles during the bagging or the generation of wrinkles when the polyimide film is wound. Accordingly, a hole is not formed at the LCP layer. In this method, a polyimide film is wound on the LCP layer like in the first molding, is bagged, and is heated and molded by an autoclave. The wrinkles generated in the first molding are removed by two times of molding.

Wrinkles need to be formed on a bag during the bagging of the molding of the CFRP. However, the wrinkles may cause wrinkles to be generated on the CFRP. Since the wrinkles may become origins of fracture, the wrinkles need to be removed. In this embodiment, after the lamination of the CFRP, a heat-shrinkable tape is spirally wound so as to be tensed, is tightened up, and is tightened up by the heat shrinkage of the heat-shrinkable tape during the thermal hardening of the CFRP, so that the generation of wrinkles is prevented.

The entire disclosure of Japanese Patent Application No. 2008-107549 filed on Apr. 17, 2008 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A method for manufacturing a resin pipe, comprising:
    winding a first sheet member spirally around a curved portion of a bar multiple times until a desired thickness is reached;
    holding the first sheet member by welding ends of the sheet member;
    winding a second sheet member around a linear portion of the bar to define a predetermined thickness on the linear portion of said bar;
    heating the first and second sheet members,
    wherein the first and second sheet members are melted and molded into a resin pipe by the heating,
    removing the bar from the resin pipe after the heating, and wherein
    the bar is made of a water-soluble material withstanding the heating,
    the bar is dissolved in water so as to be removed from the resin pipe after the heating,
    wherein the heating is performed, after heat-resistant film is wound on an outer peripheral surface of the first sheet member, and
    wherein heat-resistant film is wound on the outer peripheral surface of the first sheet member for each heating, and the heating is performed two or more times.

2. A method for manufacturing a resin pipe, comprising:
heating a sheet member after winding the sheet member around a bar desired multiple times and holding the sheet member,
wherein the sheet member is melted and molded into a resin pipe by the heating, and the bar is removed from the resin pipe after the heating, wherein the heating is performed relative to a bar that is made of a water-soluble material capable of withstanding the heating and which bar has a curved central axis extending along a direction of elongation, and
wherein the sheet member is wound around the bar and held, and the bar is dissolved in water so as to be removed from the resin pipe after the heating,
wherein the heating is performed, after a heat-resistant film is wound on an outer peripheral surface of the sheet member that is held while being wound around the bar, and
wherein heat-resistant film is wound on the outer peripheral surface of the sheet member for each heating, and the heating is performed two or more times.

3. A method for manufacturing a resin pipe, comprising:
spirally winding an elongated strip of sheet member around a bar in overlapping fashion multiple times by fixing one end of the sheet member relative to the bar and maintaining a tension state in the sheet member, and wherein the bar has a curved central axis extending in a direction of elongation of the bar as to define a curved portion in said bar, and the spirally winding includes spirally winding the sheet member around the curved portion of the bar, and wherein spirally winding in overlapping fashion includes overlapping the sheet member at a wind start end and a wind finish end;
and welding the overlapping sheet member at the wind start end and the wind finish end, wherein welding of the wind finish end includes welding the overlapping sheet member while an unwound extension portion of the sheet member at the wind finish end is retained in a tension state, and
separating the unwound extension portion of sheet member extending off from the wind finish end following welding of the overlapping member at the wind finish end;
and subsequent to welding of the wind finish end, heating the spirally wound sheet member until the sheet member is melted and molded into a resin pipe by the heating, wherein heating the spirally wound sheet member until the sheet member is melted and molded into a resin pipe by the heating comprises:
(a) wrapping a heat resistant film about the spirally wrapped portion of the sheet material extending along the curved portion of the bar and applying an overall heat application to both the heat resistant film and sheet material extending along the curved portion; and
repeating step (a).

4. The method according to claim 1, wherein the first sheet member is held while being spirally wound around the bar and there is sheet member overlapping at a wind start end and a wind finish end, and welding of the ends is achieved by welding the wind start end and the wind finish end of the first sheet member, with a respective portion of the first sheet member below, by use of heat.

5. The method according to claim 1, wherein the winding of the first sheet member around the bar and the holding of the first sheet member are performed two or more times.

6. The method according to claim 1, wherein the heating is performed, after the heat-resistant film is spirally wound on the outer peripheral surface of the first sheet member on the curved portion and held while being tensed in the winding direction.

7. The method according to claim 1, wherein an outer pipe made of a fiber reinforced resin composite material is molded on an outer peripheral surface of the resin pipe.

8. The method according to claim 7, wherein the fiber reinforced resin composite material is hardened while the fiber reinforced resin composite material is tightened up by a heat-shrinkable tape, and molded into an outer pipe, by performing heating while the heat-shrinkable tape is wounded on an outer peripheral surface of the fiber reinforced resin composite material that is formed on the outer peripheral surface of the resin pipe.

9. A method for manufacturing a resin pipe, comprising:
winding a first sheet member spirally around a curved portion of a bar multiple times until a desired thickness is reached;
holding the first sheet member by welding ends of the sheet member;
winding a second sheet member around a linear portion of the bar to define a predetermined thickness on the linear portion of said bar;
heating the first and second sheet members,
wherein the first and second sheet members are melted and molded into a resin pipe by the heating,
removing the bar from the resin pipe after the heating, and wherein
the bar is made of a water-soluble material withstanding the heating,
the bar is dissolved in water so as to be removed from the resin pipe after the heating,
wherein an outer pipe made of a fiber reinforced resin composite material is molded on an outer peripheral surface of the resin pipe,
wherein the fiber reinforced resin composite material is hardened while the fiber reinforced resin composite material is tightened up by a heat-shrinkable tape, and molded into an outer pipe, by performing heating while the heat-shrinkable tape is wounded on an outer peripheral surface of the fiber reinforced resin composite material that is formed on the outer peripheral surface of the resin pipe, and
wherein when the heat-shrinkable tape is wound on the outer peripheral surface of the fiber reinforced resin composite material, the heat-shrinkable tape is spirally wound on the outer peripheral surface of the first sheet member on a curved portion and held while being tensed in the winding direction.

10. The method of claim 1 wherein winding the second sheet member includes a linear winding around the bar.

11. The method of claim 1 wherein an edge of the second sheet member is in abutment with an adjacent edge of the first sheet member.

12. The method of claim 11 wherein adjacent edges of said second and first members are covered by a third sheet member.

13. The method of claim 1 wherein the first sheet member is a belt shaped sheet member having a thinner width than the second sheet member.

14. The method of claim 13 wherein the thinner width sheet member wrapping is limited to the curved portion of the bar.

* * * * *